3,674,462
Patented July 4, 1972

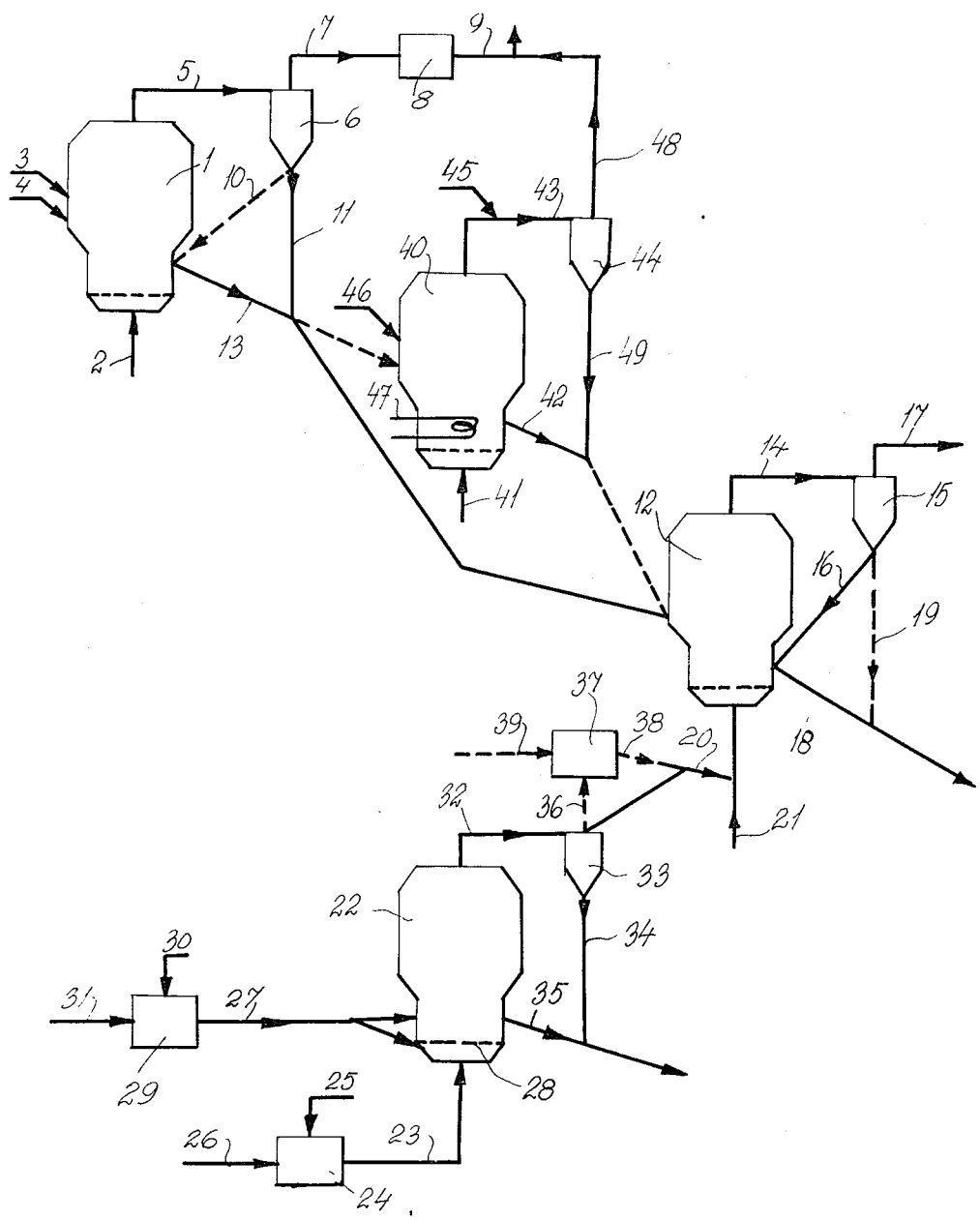

3,674,462
PROCESS FOR LOW TEMPERATURE CHLORINATION OF ROASTED PRODUCTS FROM AN IRON SULPHIDE ROASTING PROCESS PRIOR TO LEACHING OUT THE NONFERROUS METAL PRESENT THEREIN

Karl Goran Gorling, Lidingo, Sweden, assignor to Boliden Aktiebolag, Stockholm, Sweden
Filed Nov. 21, 1969, Ser. No. 878,851
Claims priority, application Sweden, Dec. 31, 1968, 18,068/68
Int. Cl. C22b 1/10
U.S. Cl. 75—9
5 Claims

ABSTRACT OF THE DISCLOSURE

A process for roasting sulphidic iron material or mixtures of sulphidic and oxidic iron material and chlorinating nonferrous metals present in said materials at low temperatures, whereafter the chlorinated nonferrous metals are leached out and recovered, in which the material is first roasted in a fluidized bed reactor at a temperature between 700 and 1100° C., while introducing oxygen or a gas containing free oxygen in a limited amount, whereafter the material, subsequent to desulphurizing and cooling is treated with chlorine, hydrogen chloride or iron chloride or a gas containing chlorine or hydrogen chloride, in a fluidized bed reactor at a temperature of 300–600° C., while maintaining fluidization by introducing a gas from beneath the reactor, said gas being optionally mixed with the chlorinating substance.

---

The present invention relates to a novel process for low temperature chlorination of nonferrous metals in a magnetite-containing material obtained from the roasting of iron sulphide or iron sulphide together with iron oxide, wherewith the chlorinated nonferrous metals present therein can be leached in chlorinated form and recovered.

Low temperature chlorination or chlorination roasting is a well known method for recovering such metals as copper, gold, silver, zinc, cobolt, nickel and lead. The process is also used for purifying iron raw materials intended for use in the manufacture of steel from said metals. The demands placed by the iron mill on the quality of the starting material for steel manufacture have steadily increased with regard to the percentage of foreign substances contained by the material. Examples of such undesired, foreign substance include copper, arsenic, antimony, sulphide, zinc, lead, cobolt, nickel, bismuth and tin.

EARLIER KNOWN PROCESSES

When roasting sulphuric material in accordance with conventional fluidized bed roasting processes, the roasted products will contain the major portion of the arsenic, lead, tin, bismuth and antimony present in the sulphidic material, and also its full quantity of copper, zinc, nickel and cobolt. Several methods of freeing such material from non-desirable constituents have been suggested and a number of variations of the chlorinating processes has been suggested and tried. One such process entails chlorinating roasting of the product with subsequent leaching, but this process can only be applied when the roasted product contains low percentages of arsenic and lead. Another process is one which entails chlorinating volatilization process, for example such as that defined in the Swedish Pat. 188,-454 and French Pat. 1,570,317. This latter process in particular provides an advantageous solution to the problem.

Despite the advantages gained by the aforementioned process, it has been discovered desirable under certain circumstances to chlorinate at temperature which are so low that the metal chlorides are not removed by volatilization, but are instead recovered by leaching.

The chlorination volatilization processes are primarily suitable for the removal of low, undesirable contents of nonferrous metals in iron raw materials. If it is primarily desired to recover and preserve nonferrous metals, a conventional chlorinating roasting process with subsequent leaching is often more to advantage and, especially if it is desired to use inexpensive solid chlorinating substances, a low temperature chlorination is to be preferred, since residues of the chlorinating substance remain in the roasted products and contaminate the iron material if they cannot be removed by leaching. If water vapour is present in the gases, a low temperature is favourable, since the risk of hydrolysis of the chlorides thereby becomes less predominant. As a result of the low temperature, it is even possible to treat in the fluidized bed reactor material which tends to sinter at the high temperatures required for the volatilization process. At lower temperatures, the requirements placed on the material from which the chlorinating apparatus is constructed are also lower. The chlorinating substance used in the most favoured chlorinating roasting process is sodium chloride. In principle, the proces is conducted so that roasted products containing nonferrous metals are mixed with approximately 10% sodium chloride and roasted in a story furnace at approximately 550° C. In order to disassociate chlorine from sodium chloride for the chlorinating process, it is necessary to sulphate sodium chloride in the story furnace during the treatment process, essentially in accordance with the formula

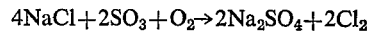
$$4NaCl + 2SO_3 + O_2 \rightarrow 2Na_2SO_4 + 2Cl_2$$

Hydrogen chloride can also form in the presence of steam.

The process thus presumes a sulphating roasting of the products. Sulphating of sodium chloride is promoted by the presence of $Fe_2O_3$, which acts as a catalyst for the formation of $SO_3$. To ensure that chlorine and hydrogen chloride are developed in sufficient quantities, it is therefore necessary that the charged material contains a determined minimum quantity of sulphur. This sulphur may comprise sulphur remaining in the roasted products subsequent to the sulphide roasting process or may originate from iron sulphide incorporated in a material changed to the chlorination furnace. The heat require for the process is generated by combusting residue sulphides or the sulphide material charged to the furnace. In addition, supplementary firing with gas or oil is normally required, the gas taken from a blast furnace being used for the purpose, for example. When arsenic, lead and antimony remain in the leached products as impurities, and, furthermore, render the leaching process difficult, roasted products having a higher content than approximately 0.08% arsenic and approximately 0.40% lead cannot be treated by the chlorinating roasting process. The waste gases from the chlorinating roasting process are washed, and hydrogen chloride and volatilized metal chlorides dissolved in the wash solution may be passed to the leaching solution. Subsequent to the leaching process, the sodium sulphate formed during the chlorination process is found in the leaching liquid. The sodium sulphate is normally recovered as Glauber's salt or calcinated sodium sulphate, after vacuum evaporation and crystallization of the sodium sulphate. Recovery of the substance in this manner is normally necessary from the point of view of environment. Proposals have also been made whereby the roasting process is effected with chlorine gas, but for economic reasons sodium chloride has been preferred.

GENERAL DESCRIPTION

The present invention involves a process which affords considerable advantages in relation to the processes known to the art. In accordance with the novel process, a roasted product obtained from the roasting of iron sulphide in a fluidized bed reactor at temperatures between 700 and 1100° C. while introducting oxygen or a gas containing free oxygen in such quantities that the partial pressure of oxygen in the resulting roaster gas lies beneath a curve in a coordinate system where the ordinate expresses the partial pressure of oxygen in atmospheres as $\log_{10} p_{O_2}$ and the abscissa temperatures in ° C. which pass through the following points:

| $\log_{10} p_{O_2}$, $p$ in atm: | Temperature, ° C. |
| --- | --- |
| −9.0 | 700 |
| −6.5 | 800 |
| −4.5 | 900 |
| −3.0 | 1000 |
| −2.3 | 1050 |

The partial pressure of oxygen should not be lower than that which, for reasons of a thermodynamic nature, are necessary for magnetite to exist, i.e. a partial pressure of oxygen corresponding to a curve through the points:

| $\log_{10} p_{O_2}$, atm.: | Temperature, ° C. |
| --- | --- |
| −15.0 | 700 |
| −13.5 | 800 |
| −12.0 | 900 |
| −10.7 | 1000 |
| −10.0 | 1050 |

Oxidic iron material may also be charged to advantage during the roasting process up to the limit where the exothermic heat is insufficient to maintain the desired temperature. When roasting in this manner, it is possible to remove the major portion of the arsenic, lead, tin, bismuth, antimony and sulphur present in the raw material. Subsequent to the roasting process, the cinders are isolated and the roasted goods further treated by introducing a chlorinating substance, which comprises chlorine, hydrogen chloride or iron chloride or a gas containing chlorine or hydrogen chloride or iron chloride or a gas containing chlorine or hydrogen chloride. Consequently, no sulphating reaction is required when proceeding in accordance with the present invention.

RAW MATERIAL

When iron chloride is used as the chlorinating substance, it is suitably introduced suspended in a gas or in a vapourized form. The iron chloride spontaneously liberates chlorine or hydrogen chloride upon reacting with oxygen or water.

If the roasting process is carried out so that the resulting partial pressure of oxygen lies beneath a curve through the points:

| $\log_{10} p_{O_2}$, $p$ in atm.: | Temperature, ° C. |
| --- | --- |
| −12.0 | 700 |
| −9.5 | 800 |
| −7.5 | 900 |
| −5.8 | 1000 |
| −5.0 | 1050 |

The iron is obtained practically completely in the form of magnetite, which affords certain advantages if it is desired to enrich the material with magnetite prior to the chlorinating process. A complete magnetite-yielding roasting process further reduces the risk of copper and zinc-ferrite formation. When roasting an iron sulphite material in accordance with the above defined conditions, any arsenic, antimony, tin and lead present in the material are removed to a very large extent. These substances cannot be removed by conventional oxidizing roasting in a fluidized bed furnace. When roasting in accordance with the present invention, the grains of the resulting material are much coarser than in the case of a conventional oxidizing roasting process. It has been found possible to take out more than 70% of the roasted products from the bed when roasting fine pyrite, while when roasting in accordance with conventional fluidized bed processes it is necessary to separate the predominant portion of the roasted goods in a fine grain form in cyclones.

When very fine grain pyrites, for example flotation pyrites, are roasted, a roasted product is obtained in accordance with the present invention which, owing to its fine granular condition, normally renders it difficult to effect the leaching process. In this case it has been found possible to increase the grain size by compacting the material in accordance with Belgian Pat. 43,777 and Swedish Pat. No. 332,645.

CHLORINATING SUBSTANCE

The chlorinating process takes place by introducing hydrogen chloride, chlorine gas or iron chloride to the chlorinating reactor. Hydrogen chloride can be produced in different ways, normally while recovering sodium sulphate. One such process is the Hargreaves-Robinson-process where NaCl, $SO_2$, air and water-vapour are reacted at 500° C. in accordance with the reaction:

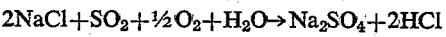
$2NaCl + SO_2 + \tfrac{1}{2} O_2 + H_2O \rightarrow Na_2SO_4 + 2HCl$

HCl can also be produced by reacting sodium chloride with concentrated sulphuric acid in indirectly heated sulphate furnaces provided with mechanical agitators, at a temperature of approximately 550–600° C. in accordance with the reaction:

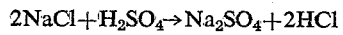
$2NaCl + H_2SO_4 \rightarrow Na_2SO_4 + 2HCl$

According to a newly described process, where the reaction takes place according to the above mentioned formula, the so-called "Cannon-process," finely ground sodium chloride is treated with superheated sulphuric acid vapour in a fluidized bed reactor made of steel, the sodium chloride is injected with fluidizing gas comprising hot air or hot chimney gases and sodium sulphate is taken out from the bed and from a cyclone placed after the furnace. When practising these processes for producing HCl outside the chlorinating reactor, water-free sodium sulphate is obtained. This is more advantageous than obtaining the sodium sulphate in the leaching solution, which is the result when mixing sodium chloride in the roasted product. For the purpose of generating HCl, a practically stoichiometric quantity of sulphur in the form of sulphuric acid is required, in accordance with said processes, while when sulphating sodium chloride, owing to incomplete reaction, a larger quantity of sulphur in the form of residual sulphur or additional sulphur must be used in conventional chlorinating roasting processes. Hydrogen chloride can also be expelled from hydrochloric acid, for example produced in accordance with the aforegoing. Hydrogen chloride obtained in other ways can, of course, also be used in the chlorinating process.

Primary chlorine gas is a splendid chlorinating substance, but is normally too expensive to be used economically unless obtained as a secondary product in another process.

The suitable concentration of the chlorinating gases generally depends on the amount of gas which need be introduced in order to maintain fluidization in the chlorinating reactor and the desired stay times. It is not possible to determine precisely how long the roasted products must remain in the reactor since this is greatly dependent on the chemical and physical properties of the roasted product and the concentration of chlorinating substance. The grain size distribution is of particularly high importance. The reactor must therefore be dimensioned with respect to the requisite stay time of the roasted goods in the reactor, the gas velocity and desired capacity. The requisite stay time and suitable content of chlorinating substance can be easily determined experimentally by one skilled in such matters on a laboratory scale and computed with respect to available raw material. The requisite stay time may vary greatly for different materials. For example, it can be mentioned that when chlorinating roasted flotation pyrites with 0.18% copper and 0.6% zinc over 90% chlorination of copper and zinc was obtained in 10 minutes at 500° C. Dimensioning of the chlorinating reactor and other parameters can be determined by series calculations.

This can be summarized in the following points:

(1) The bed volume is calculated with respect to desired capacity, requisite average stay time and the volume weight of the material in fluidized state.

(2) The requisite space velocity and the quantity of chlorinating substance are determined with respect to the desired capacity and the quantity of metals present to be chlorinated.

(3) The requisite quantity of gas is computed with respect to the desired concentration of the chlorinating substance.

(4) The area of the furnace grate or grid is determined with respect to the quantity of gas charged to the reactor.

(5) The height of the bed is calculated finally with respect to the area and the volume of the bed.

As is evident from the aforegoing, it is possible, for example, to reduce the area of the grate by increasing the quantity of chlorinated substance. Further variation possibilities are also evident from the aforegoing. If it is desired to chlorinate a very fine-grain roasted product, this will mean that when using a relatively diluted chlorinating substance a larger bed area will be required. In this connection, the fluidizing process can, instead, be effected with a fluidizing supplementary substance, such as agglomerated iron oxide, whereby a smaller grate area is required. The material is transferred with the roaster gas to a cyclone where the roasted products are separated and either return to the bed or removed from the leaching process.

In addition to possibly charging gaseous chlorinating substances to the reactor, the fluidizing gas is preferably air, although other gases, such as chimney gases and terminal gases from the manufacture of sulphuric acid, substantially comprising nitrogen, can be used to advantage.

Finally, it can be mentioned that iron chloride, such as $FeCl_3$ or $FeCl_2$, can be used as a chlorinating substance. The iron chloride is charged suspended in gas through the grate or above the same. Alternatively it can be charged to the bed in an agglomerated state.

The accompanying figure illustrates graphically one embodiment of the process of the invention. A roasting process in accordance with Canadian Pat. 796,672 is effected in a fluidizing reactor 1, air being introduced at 2 in such quantities that magnetite is formed. Iron sulphide material is introduced at 3, optionally together with charged oxide material entering the reactor at 4. The roaster gases leave the reactor at 5 to a cyclone 6, where entrained roasted products are separated, whereafter the roaster gases are passed via 7 to an after-combustion zone 8 where the elementary sulphur formed during the roasting process and other oxidizable compounds, such as arsenic, arsenic sulphide etc. are combusted to oxides. The gases are then conducted away via 9 for processes which utilize the arsenic and sulphur dioxide content. The gases are cooled prior to and/or after the after-combustion stage in a waste heat boiler (not shown) while recovering steam, for example in accordance with Swedish Pat. 227,188. The material is passed from the cylone 6, optionally via 10, back to the bed in the roasting furnace, or by 11 to the chlorinating reactor 12. The material may also be completely or partially removed from the bed in the magnetite-yielding roasting process via 13 and passed to the chlorinating reactor 12. Subsequent to the chlorinating reaction, the waste gases are passed from the chlorinating reactor 12 via 14 to a cyclone 15, where entrained material is separated and optionally returned to the chlorinating reactor via 16. The waste gases are removed via 17 and washed with water, whereafter the acid wash solution is used in the leaching process. Any volatilized chlorides present will thus be embodied in the leach solution. The chlorinating substance is introduced to the chlorinating reactor 12 via 20, optionally blended with additional fluidizing gas via 21. The figure also illustrates a special embodiment of the invention in which HCl is produced in a fluidizing reactor, suitably constructed of steel. A suspension of NaCl is charged to this reactor via 23 in a gas which is formed in a mixing device 24, to which fine-grain NaCl is introduced via 25, a suspension gas via 26 and vapourized sulphuric acid via 27, either above or beneath the grate or grid 28 from a vaporizing means 29. Sulphuric acid and heat 31 are charged to the vapourizing means 29 via 30. Formed HCl is passed from the reactor 22 via 32 to a cyclone 33, in which entrained sodium sulphate formed in the reactor is separated. The resulting sodium sulphate is passed, in a calcinated state, from the cyclone 33, via 34, and direct from the bed, via 35. The hydrogen chloride, liberated from solid material, is passed either direct to the chlorinating reactor 12, via 20, or optionally to an intermediate storage site 37, via 36, where the hydrogen chloride can be stored as hydrochloric acid. Hydrogen chloride expelled from the hydrochloric acid is then passed from the intermediate, storage site 37, via 38–20. The possibility has also been indicated of charging, via 39, hydrochloric acid produced in another manner. The chlorinated roasted products are passed from the reactor 12 to the leaching stage via 18, wherewith roasted products may also be transferred direct from the cyclone, via 19, to the leaching plant. Material may also be transferred from the roasting reactor 1 to a cooling and desulphurizing reactor 40, where air is charged via 41, to completely desulphurize the roasted products before being charged, via 42, to the chlorinating reactor 12. The hot roaster gas can be passed from the desulphurizing and cooling reactor via 43, to a cyclone 44, where water may also be injected at 45 for cooling purposes in the case when a considerable quantity of entrained products is conveyed via 43. Cooling of the reactor 40 may also be effected in the bed, by introducing a cooling medium via 46, said cooling medium comprising cold material or liquid, preferably water. Cooling may also be effected indirectly during steam generation by means of cooling loop 47. Cooling permits the temperature in the chlorinating reactor to be readily adjusted in the desired manner. The gas is passed from the cyclone 44, via 48, to a plant for utilizing its $SO_2$ content. The separated material is passed from the cyclone, via 49, to the chlorinating reactor.

The advantage afforded by the present process, particularly when compared with conventional chlorinating roasting processes, can be summarized under the following points:

(1) The primary roasting enables arsenic, antimony, tin, bismuth and lead to be removed and avoids formation of copper and zinc ferrites, which facilitates the chlorinating process.

(2) All sulphur in the iron sulphide material can be appropriated.

(3) Practically stoichiometric quantities of sulphuric acid can be used in the hydrogen chloride preparation process.

(4) The chlorinating reaction is more complete in a fluidized bed reactor than in a story furnace or rotary furnace, especially when the chlorinating substance is charged in the form of a gas with the fluidizing air.

(5) The consumption of chlorinating substance is lower than in conventional chlorinating roasting processes.

(6) It is possible to work without supplementary heating, since the material can be removed at desired temperatures and since the magnetite present develops heat upon the addition of oxygen by an exothermic reaction. It is also possible to charge a certain quantity of cold material for chlorination, without particular additional heat. Under certain circumstances completely cold magnetite material can be used without additional heat.

(7) The stickiness which can occur when conventionally roasting in story furnaces with NaCl is completely avoided.

(8) The sodium sulphate is obtained separated in calcinated form.

(9) Plant costs can be considerably reduced, in that the plant can be made much smaller and simpler.

What is claimed is:

1. A process in the metallurgical treatment of sulphidic iron material containing nonferrous metals for recovering the chlorides of said nonferrous metals comprising
   (a) roasting said material in a fluidized bed reactor at a temperature between 700 and 1100° C. while introducing oxygen or a gas containing free oxygen in such a quantity that the partial pressure of oxygen in the resulting roaster gas lies beneath a curve in a coordinate system where the ordinate is expressed as the partial pressure of oxygen in atmospheres as $\log_{10} p_{O_2}$ and the abscissa expresses the temperatures in ° C., which pass through the following points:

| $\log_{10} p_{O_2}$, p in atm.: | Temperature, ° C. |
   |---|---|
   | −9.0 | 700 |
   | −6.5 | 800 |
   | −4.5 | 900 |
   | −3.0 | 1000 |
   | −2.3 | 1050 | and where the partial pressure of oxygen does not fall below those values which are corresponded by a curve passing through the following points:

| $\log_{10} p_{O_2}$, p in atm.: | Temperature, ° C. |
   |---|---|
   | −15.0 | 700 |
   | −13.5 | 800 |
   | −12.0 | 900 |
   | −10.7 | 1000 |
   | −10.0 | 1050 |

(b) removing substantially all sulfur remaining in the roasted material, by subjecting said material, while hot, to desulphurizing process in a fluidized bed,
   (c) converting the nonferrous metals to chloride form by treating the roasted and desulphurized material, while hot, solely with a compound selected from the group consisting of chlorine and hydrogen chloride at a fluidized bed temperature of 300–600° C., and
   (d) leaching the thus treated material to recover the chlorides of the nonferrous metals.

2. The process of claim 1, characterized in effecting the roasting process so that the partial pressure of oxygen in the roaster gas does not exceed the values which are corresponded by a curve passing through the following points:

| $\log_{10} p_{O_2}$, p in atm.: | Temperature, ° C. |
   |---|---|
   | −12.0 | 700 |
   | −9.5 | 800 |
   | −7.5 | 900 |
   | −5.8 | 1000 |
   | −5.0 | 1050 |

3. A process in the metallurgical treatment of a mixture of sulphide and oxidic iron material containing nonferrous metals for recovering the chlorides of said nonferrous metals comprising
   (a) roasting said iron material in a fluidized bed reactor at a tempertaure between 700 and 1100° C. while introducing oxygen or a gas containing free oxygen in such a quantity that the partial pressure of oxygen in the resulting roaster gas lies beneath a curve in a coordinate system where the ordinate is expressed as the partial pressure of oxygen in atmospheres as $\log_{10} p_{O_2}$ and the abscissa expresses the temperatures in ° C., which pass through the following points:

| $\log_{10} p_{O_2}$, p in atm.: | Temperature, ° C. |
   |---|---|
   | −9.0 | 700 |
   | −6.5 | 800 |
   | −4.5 | 900 |
   | −3.0 | 1000 |
   | −2.3 | 1050 | and where the partial pressure of oxygen does not fall below those values which are corresponded by a curve passing through the following points:

| $\log_{10} p_{O_2}$, p in atm.: | Temperature, ° C. |
   |---|---|
   | −15.0 | 700 |
   | −13.5 | 800 |
   | −12.0 | 900 |
   | −10.7 | 1000 |
   | −10.0 | 1050 |

(b) removing substantially all sulfur remaining in the roasted material, by subjecting said material, while hot, to a desulphurizing process in a fluidized bed,
   (c) converting the nonferrous metals to chloride form by treating the roasted and desulphurized material, while hot, solely with a compound selected from the group consisting of chlorine and hydrogen chloride at a fluidized bed temperature of 300–600° C., and
   (d) leaching the thus treated material to recover the chlorides of the nonferrous metals.

4. The process of claim 1 wherein hydrogen chloride is used as the chlorinating compound and is produced by the reaction of sodium chloride and vaporized sulfuric acid in a fluidized bed reactor during simultaneous preparation of calcinated sodium sulphate.

5. The process of claim 1 wherein the chlorinating compound is mixed with the fluidizing gas before introduction of the gas from beneath the reactor.

References Cited

UNITED STATES PATENTS

| 2,796,340 | 6/1957 | Cyr | 75—9 |
| 3,160,496 | 12/1964 | Vaccari et al. | 75—9 |
| 3,169,853 | 2/1965 | Es | 75—9 |

FOREIGN PATENTS

| 917,480 | 2/1963 | Great Britain | 75—9 |
| 802,037 | 9/1958 | Great Britain | 75—9 |
| 696,003 | 8/1953 | Great Britain | 75—9 |

DONALD L. WALTON, Primary Examiner

U.S. Cl. X.R.

75—26